(12) United States Patent
Joynt (10) Patent No.: US 9,163,319 B2
(45) Date of Patent: Oct. 20, 2015

(54) THREE ELECTRODE ELECTROLYTIC CELL AND METHOD FOR MAKING HYPOCHLOROUS ACID

(71) Applicant: Tennant Company, Minneapolis, MN (US)

(72) Inventor: Daniel L Joynt, Columbus, MN (US)

(73) Assignee: TENNANT COMPANY, Minneapolis, MN (US)

( * ) Notice: Subject to any disclaimer, the term of this patent is extended or adjusted under 35 U.S.C. 154(b) by 305 days.

(21) Appl. No.: 13/838,306

(22) Filed: Mar. 15, 2013

(65) Prior Publication Data

US 2014/0124377 A1    May 8, 2014

Related U.S. Application Data

(60) Provisional application No. 61/721,828, filed on Nov. 2, 2012.

(51) Int. Cl.
| | | |
|---|---|---|
| *C25B 9/04* | (2006.01) | |
| *C25B 9/00* | (2006.01) | |
| *C25B 15/00* | (2006.01) | |

(Continued)

(52) U.S. Cl.
CPC ............ *C25B 15/02* (2013.01); *C02F 1/4674* (2013.01); *C25B 1/26* (2013.01); *C25B 9/08* (2013.01); *C02F 1/42* (2013.01); *C02F 2201/4614* (2013.01); *C02F 2201/46115* (2013.01); *C02F 2209/005* (2013.01); *C02F 2209/02* (2013.01); *C02F 2209/05* (2013.01); *C02F 2209/06* (2013.01)

(58) Field of Classification Search
CPC ............ C25B 1/26; C25B 9/00; C25B 13/00; C25B 13/04; C25B 13/08; C25B 15/00; C25B 15/02; C02F 2209/06

USPC ............ 204/194, 228.1, 228.6, 228.9, 229.2, 204/242, 252, 263, 275.1, 278.5, 279, 295, 204/229.9

See application file for complete search history.

(56) References Cited

U.S. PATENT DOCUMENTS

| | | | | |
|---|---|---|---|---|
| 2009/0065352 | A1* | 3/2009 | Kitsuka et al. ............. | 204/230.7 |
| 2010/0078331 | A1 | 4/2010 | Scherson et al. | |

(Continued)

FOREIGN PATENT DOCUMENTS

WO    01/27037 A1    4/2001

OTHER PUBLICATIONS

International Search Report and Written Opinion dated May 26, 2014 for corresponding International Application No. PCT/US2013/067962, filed on Nov. 1, 2013.

*Primary Examiner* — Luan Van
*Assistant Examiner* — Alexander W Keeling
(74) *Attorney, Agent, or Firm* — David D. Brush; Westman, Champlin & Koehler, P.A.

(57) ABSTRACT

A method and apparatus are provided for electrolyzing a source liquid in an electrolytic device. The electrolytic device includes a first cathode in a cathode chamber; and an anode and a second, auxiliary cathode in an anode chamber. The anode chamber and cathode chamber are separated by a barrier, and the anode and the auxiliary cathode are separated by a gap that lacks a barrier. While electrolyzing the source liquid with the electrolytic device, a level of current applied to the auxiliary cathode is adjusted in response to pH of an anolyte liquid produced from the source liquid by the anode chamber to maintain the pH within a desired range.

23 Claims, 4 Drawing Sheets

(51) Int. Cl.
  *C25B 15/02* (2006.01)
  *C25B 1/26* (2006.01)
  *C02F 1/467* (2006.01)
  *C25B 9/08* (2006.01)
  *C02F 1/42* (2006.01)

(56) References Cited

U.S. PATENT DOCUMENTS

2012/0085657 A1    4/2012   Bhavaraju
2012/0085658 A1*   4/2012   Bhavaraju et al. ............ 205/443
2012/0175267 A1    7/2012   Bhavaraju et al.

* cited by examiner

THREE ELECTRODE ELECTROLYTIC CELL AND METHOD FOR MAKING HYPOCHLOROUS ACID

CROSS-REFERENCE TO RELATED APPLICATION

The present application is based on and claims the benefit of U.S. Provisional Patent Application Ser. No. 61/721,828, filed Nov. 2, 2012, the content of which is hereby incorporated by reference in its entirety.

BACKGROUND

The present disclosure relates cleaning and sanitizing systems, and in particular, to systems for generating hypochlorous acid (HOCl) with electrolysis reactions.

Electrolytic cells are used in a variety of different applications for changing one or more characteristics of a fluid. For example, electrolytic cells have been used in cleaning/sanitizing applications, medical industries, and semiconductor manufacturing processes. Electrolytic cells have also been used in a variety of other applications and have had different configurations. For cleaning/sanitizing applications, electrolytic cells are used to create anolyte liquids and catholyte liquids. Anolyte liquids containing hypochlorous acid (and other forms of free chlorine) have known sanitizing properties, and catholyte liquids have known cleaning properties.

SUMMARY

An aspect of the present disclosure relates to a method including electrolyzing a source liquid in an electrolytic device. The electrolytic device has a first cathode in a cathode chamber; and an anode and a second, auxiliary cathode in an anode chamber. The anode chamber and cathode chamber are separated by a barrier, and the anode and the auxiliary cathode are separated by a gap that lacks a barrier. During the step of electrolyzing, a level of current applied to the auxiliary cathode is adjusted in response to pH of an anolyte liquid produced from the source liquid by the anode chamber.

Another aspect of the present disclosure relates to a system for generating hypochlorous acid. The system includes an electrolytic cell configured to receive a source liquid and including: a first cathode in a cathode chamber; and an anode and a second, auxiliary cathode in an anode chamber. The anode chamber and cathode chamber are separated by a barrier, and the anode and the auxiliary cathode are separated by a gap that lacks a barrier. The system further includes a control circuit having a pH control input. the control circuit is configured to energize the electrolytic cell to produce an anolyte liquid from the source liquid in the anode chamber and to adjust a level of current applied to the auxiliary cathode in response to the pH control input.

Another aspect of the present disclosure relates to a non-transitory computer-readable medium having computer-readable instructions that when executed by a processor configure the processor to implement a method of generating hypochlorous acid. The instructions include instructions configured to cause the processor to energize an electrolytic device. The device has a first cathode in a cathode chamber, and an anode and a second, auxiliary cathode in an anode chamber. The anode chamber and cathode chamber are separated by a barrier, and the anode and the auxiliary cathode are separated by a gap that lacks a barrier. Further instructions are configured to cause the processor to adjust a level of current applied to the auxiliary cathode, while energizing the electrolytic cell, in response to pH of an anolyte liquid produced from a source liquid by the anode chamber.

DETAILED DESCRIPTION

The present disclosure is directed to a generator and method for electrochemically generating hypochlorous acid (HOCl) from a salt solution (e.g., sodium chloride (NaCl) solution) using electrolysis. Hypochlorous acid is the predominant form of free chlorine in aqueous solution in the range of 5-7 pH and is the most effective and desired form of chlorine for sanitizing and disinfecting by killing microorganism-based contaminants. As such, the generator may be a stationary generator configured to dispense the generated hypochlorous acid to an application site, to fill portable containers or mobile cleaning/sanitizing units (e.g., such as mobile floor cleaners sold by Tennant Company of Golden Valley, Minn.), or may be configured as an onboard generator utilized in a mobile cleaning unit, for example.

It has been found by the inventors of the present application that most existing electrolytic cells designed to produce hypochlorous acid include two-chambers (an anolyte chamber and a catholyte chamber), each chamber having a respective electrode and being separated by a barrier, such as a diaphragm or membrane. These two-chamber, two-electrode electrolytic cells typically produce hypochlorous acid by either recirculating some of the alkaline catholyte back through the anode chamber of the cell or by mixing catholyte with the acidic anolyte output downstream of the cell. This is done to maintain the pH of the anolyte between 5 pH-7 pH, so that the predominant form of free chlorine is hypochlorous acid.

If the pH drops below 5 pH, the majority of free chlorine converts to chlorine gas, which is not stable in solution. If the pH rises above 7, the majority of free chlorine converts to hypochlorite which is much less effective at disinfecting. The normal tendency of the anolyte output is to drop below 5 pH as more current is sent through the cell, especially if the electrolyte in the anode chamber is not fully saturated with salt. By recirculating some of the high pH catholyte back through the anode chamber or mixing directly with the anolyte output, the pH of the anolyte can be maintained above 5 pH, which is within the range of hypochlorous acid. However, achieving dynamic mechanical and automatic control of the proportioning of the recirculation or mixing of catholyte can be difficult. Both of these common previous approaches require additional hydraulic controls such as valves, orifices and pumps, which add cost and may be susceptible to failure due to scaling downstream of the cell.

As discussed below, the generator of the present disclosure includes an improved electrolytic cell design and method of operation and control to produce hypochlorous acid. In addition to a cathode electrode present in the cathode chamber and an anode electrode present in the anode chamber, the electrolytic cell includes an "auxiliary" cathode electrode in the anode chamber, which is separated from the anode electrode by a small gap with no barrier. In an exemplary, non-limiting embodiment, the resulting generator has one or more of the following characteristics: simplified hydraulic plumbing and mechanical controls; higher reliability and lower cost; higher electrolytic cell efficiencies; and greater dynamic control over the resulting pH of the anolyte hypochlorous output.

Figure 1:
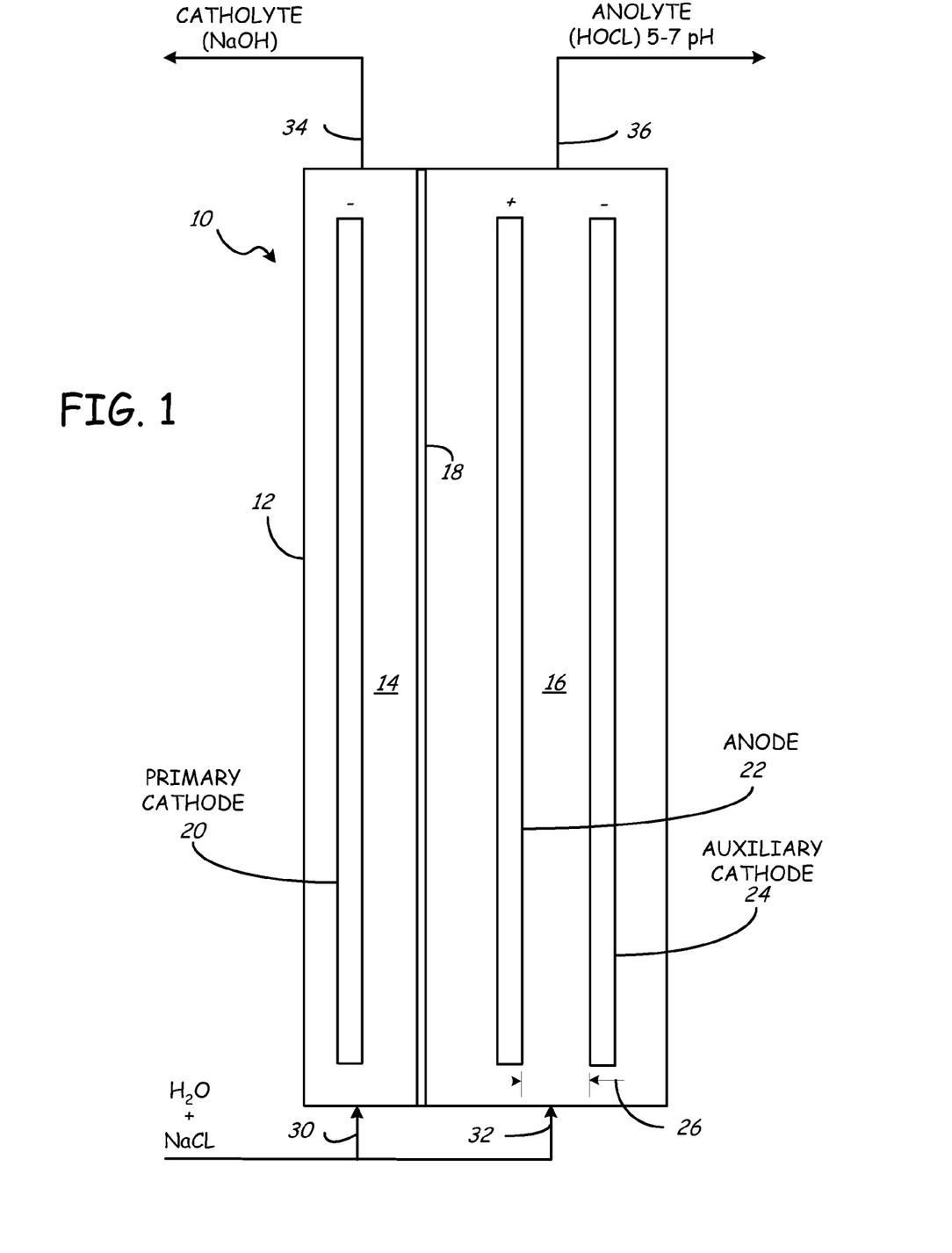
FIG. 1 is a schematic illustration of an electrolysis cell having three electrodes according to an exemplary aspect of the present disclosure.

FIG. 1 is a schematic diagram of an electrolytic cell 10 according to an exemplary aspect of the present disclosure. Electrolytic cell 10 includes a housing 12, such as a container or channel, a cathode chamber 14, an anode chamber 16 and a barrier 18, which at least partially or completely separates the cathode chamber 14 from the anode chamber 16. The cathode chamber 14 includes at least one first, "front" or "primary" cathode electrode 20, and the anode chamber 16 includes at least one anode electrode 22. In addition, the anode chamber 16 includes at least one "auxiliary" cathode electrode 24. The auxiliary cathode electrode 24 in the anode chamber is separated from the anode electrode 22 by a small gap 26, such as 1 mm-3 mm, which lacks any barrier between the anode electrode 22 and the auxiliary cathode electrode 24, for example. The electrolytic cell 10 further includes an inlet 30 to the cathode chamber 14, an inlet 32 to the anode chamber 16, a catholyte output 34 from the cathode chamber 14, and an anolyte output 36 from the anode chamber 16.

To produce hypochlorous acid, the cathode and anode chambers of electrolytic cell 10 are fed with a liquid, such as a mixture of water and a salt solution (e.g. $H_2O$ and sodium chloride or potassium chloride), through inlets 30 and 32, and a voltage potential difference is applied between the cathode electrode 20 and the anode electrode 22 to induce an electrical current between the electrodes and across barrier 18. A voltage potential difference is also applied between auxiliary cathode electrode 24 and anode electrode 22.

When electrical current is applied to the auxiliary cathode electrode 24 during operation of cell 10, hydroxide ions ($OH^-$) are produced inside the anode chamber 16, which then react with and neutralize acid protons or hydronium ions ($H^+$ or $H_3O^+$) being simultaneously produced by the anode electrode 22. The result is a reduction in the acidity of the anolyte liquid produced by the cell, keeping the pH of the anolyte output within a near neutral range, such as the 5 pH-7 pH range of hypochlorous acid. Hence, no additional recirculation of catholyte into the anode chamber or mixing of the catholyte with the anolyte downstream of the cell is needed for pH control. This can significantly reduce the complexity of a hypochlorous acid generator, in some embodiments.

Using the auxiliary cathode electrode 24, the resulting pH of the anolyte can be dynamically controlled by modulating the amount of current sent to the auxiliary cathode electrode. A pH sensor can be used to measure directly the resulting pH of the anolyte coming out of the anolyte output 36, which can provide an input to a control circuit of the generator to dynamically modulate the amount of current sent to the auxiliary cathode electrode 24 to maintain a desired pH. A closed-loop control method can be employed using the pH sensor and the control circuit to maintain anolyte pH targets without requiring any additional mechanical or hydraulic controls, for example. In addition, the auxiliary cathode electrode 24 acts as a second cathode, which does not need any special catalytic coating. For example, the auxiliary cathode electrode may be fabricated with untreated titanium in order to minimize additional costs of the 3-electrode cell. Since the hydroxide ions are produced directly inside of the anode chamber 16 rather than being recirculated or mixed from the cathode chamber, the resulting cell current efficiency is higher. And, since both sides of the anode electrode 22 are being utilized with cathodes on each side, the effective area of the cell is increased and hence the voltage efficiency is higher, resulting in a lower overall operating voltage and lower power requirements, in an exemplary embodiment.

If the total amount of current sent through cell 10 remains substantially constant, the amount of free chlorine produced by the anode will also stay substantially constant, regardless of how much current is modulated to the auxiliary cathode 24. However, as more or less current is sent to the auxiliary cathode, the resulting catholyte produced by the first cathode will vary in concentration. If this variation in current is kept within a reasonable dynamic range, the impact on catholyte output 34 will be acceptable and manageable for typical cleaning applications. Similar limitations apply to any existing method of catholyte recirculation or mixing to produce hypochlorous acid.

Alternately, if the current applied to the first cathode 20 is held constant while modulating the current applied to the auxiliary cathode 24, the concentration of the catholyte output 34 can also be held constant. However, the amount of free chlorine produced by the anode will vary, since the combined currents applied to the two cathode electrodes 20, 24 is passed through the single anode electrode 22. Hence the concentration of salt in the liquid supplied to the anode chamber 16 though inlet 32 would also need to be modulated to maintain a desired concentration of free chlorine (typically 100-600 ppm) in the anolyte output 36. Therefore a constant overall cell current approach may provide a simpler method for controlling the anolyte using the auxiliary cathode electrode with the consequence of some variation in the catholyte hydroxide ion concentration. However, embodiments of the present disclosure can be configured to use either approach.

Figure 2:
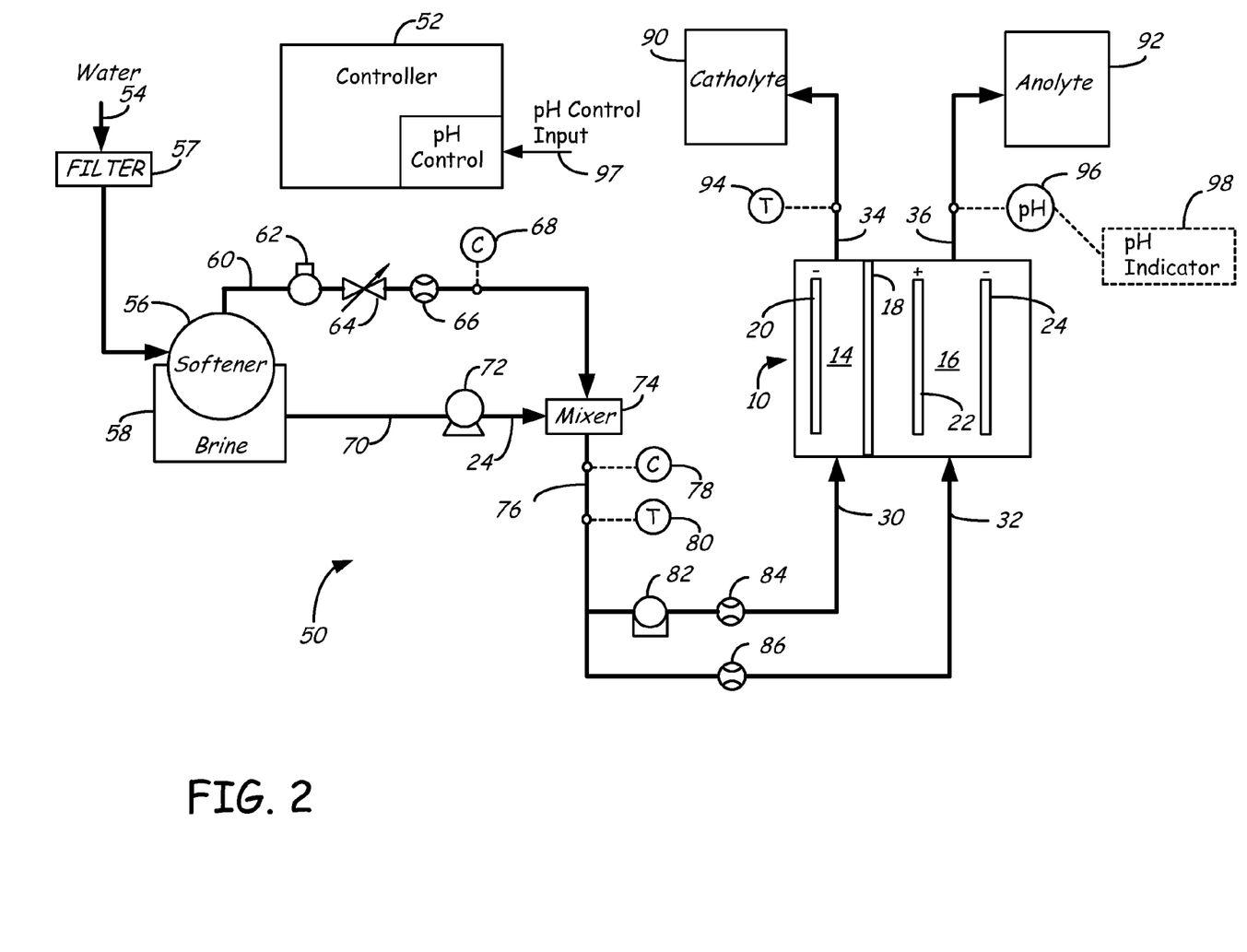
FIG. 2 is a schematic illustration of a generator for electrochemically generating hypochlorous acid according to an exemplary aspect of the present disclosure.

FIG. 2 illustrates an example of a hypochlorous acid generator 50 according to an illustrative aspect of the present disclosure. Generator 50 may be utilized in combination with any suitable electrolysis-based dispensing system (e.g., in stationary generators and/or in mobile units), and includes controller 52. Controller 52 includes one or more control circuits configured to monitor and operate the components of generator 50 over one or more power and communication lines (e.g., electrical, optical, and/or wireless lines, not shown).

For example, one or more of the control functions performed by controller 52 can be implemented in hardware, software, firmware, etc., or a combination thereof. Such software, firmware, etc. may stored on a non-transitory computer-readable medium, such as a memory device. Any computer-readable memory device can be used, such as a disc drive, a solid state drive, CD-ROM, DVD, flash memory, RAM, ROM, a set of registers on an integrated circuit, etc. For example, the control circuit can be implemented partly or completely in a programmable logic controller and/or a processing device such as a microcontroller and/or other processor that executes instructions stored in a memory device, wherein the instructions are configured to perform the steps of the control process when executed by the processor device to convert the processing device into a special purpose computer.

Controller 52 and the components of generator 50 may be powered from one or more external and/or internal power sources (not shown). Generator 10 may include a variety of additional elements than those shown in FIG. 2, such as additional flow control mechanisms, (e.g., additional flow valves), pressure regulators, temperature sensors, pressure sensors, pH sensors, conductivity sensors, and the like, each of which may be monitored and/or operated by controller 52.

As shown, generator 50 operates by supplying input liquid, such as water, through water line 54 to water softener 56 at a desired flow rate. Water line 54 may be any suitable supply source of water or other suitable liquid. Water entering generator 50 through water line 54 may also pass through an input filter 57 prior to entering water softener 56, and desirably has a suitable pressure to maintain a suitable flow rate through generator 50. Suitable inlet pressures for the water entering generator 50 range from about 2 bars (about 30 pounds/square inch (psi)) to about 7 bars (about 100 psi), for example.

Water softener 56 is configured to receive the water from water line 54 and to soften the water with a core resin, for example, prior to further relaying the water through generator 50. A portion of the water introduced to water softener 56 may also be introduced into brine tank 58 to form a brine solution, which is a saturated solution of sodium chloride in water, for example. The amount of water introduced from water softener 56 into brine tank 58 may be controlled by a float valve, for example, to prevent the water from overflowing brine tank 58. However, this may be controlled by other means, such as a control circuit and a flow control mechanism. Alternatively, brine tank 58 may be separate unit from water softener 56.

The softened water exits water softener 56 through water line 60, where the water pressure and flow rate may be controlled by pressure regulator 62, valve 64, and orifice 66, for example. In one example, pressure regulator 62, valve 64 and orifice 66 are purely mechanical devices that regulate the flow rate and pressure. Valve 64 has an on state and an off state, and orifice 66 has a fixed orifice size and shape. However, in other examples the system may have dynamic flow controls, which may be controlled by controller 52, for example. The pressure regulator 62 and orifice 66 control the overall flow rate of the liquid supplied to electrolytic cell 10. Pressure regulator 62, valve 64 and orifice 66 can be located at other locations along the flow path from softener 56 to the input of electrolytic cell 10, for example.

The conductivity of the water through water line 60 may be monitored by controller 52 via conductivity sensor 68. Correspondingly, a first portion of the brine solution from brine tank 58 may be directed through brine line 70, such as with pump 72, to first mixing location 74. At first mixing location 74, the brine solution from brine line 70 mixes (passively or actively) with the softened water from water line 60, which then flows through mixed line 76 to electrolytic cell 10 (as shown in FIG. 1). After mixing at first mixing location 74, the conductivity of the mixed solution through mixed line 76 may be monitored by controller 52 via conductivity sensor 78.

Controller 52 monitors the difference in conductivity measurements from conductivity sensors 68 and 78 to ensure the correct amount of the brine solution from brine line 70 is pumped to first mixing location 74. In particular, controller 52 may modulate pump 72 using a process control loop to maintain a preset salt concentration in the mixed solution flowing through mixed line 76. In one example, the system is configured to produce a concentrated solution of hypochlorous acid that is later diluted down by factors of 3:1 to 10:1, for example. In this example, the targeted salt concentrations may be somewhat high, such as roughly 4000 parts-per-million (ppm) by weight or volume of sodium chloride. However, an exemplary range of the salt concentration is from 200 ppm to 8000 ppm. An objective of the conductivity control system is to maintain a substantially constant level of chlorides (ppm) in the solution flowing into the cell, through mixed line 76, which will ensure a substantially constant amount of free chlorine is produced by the cell.

Generator 50 may further include a temperature sensor 80 for measuring the temperature of the mixed solution flowing through mixed line 76. The resulting temperature measurement may be used as a further input variable to one or more of the control functions performed by controller 52.

A portion of the mixed solution flowing through mixed line 76 is fed to inlet 30 of cathode chamber 14 though flow switch 82 and orifice 84. Another portion of the mixed solution is fed to inlet 32 of anode chamber 16 though orifice 86. Orifices 84 and 86 control rates of the mixed solution into the respective chambers of cell 10. Flow sensor/switch 82 indicates when the system has achieved a minimum flow rate and is used as a fail-safe feedback to controller 52 to prevent overheating of the cell 10 if the water supply is shut-off or restricted upstream of the sensor or system. The flow sensor 82 is not required to be very precise and typically activates to shut down system 50 when the flow rate drops below about half the desired operating flow rate. In another embodiment, flow sensor/switch 82 is eliminated. A similar operation can be performed using two temperature sensors, 80 and 94, one upstream and one downstream of the cell 10. If the flow is shut off or restricted, the temperature inside the cell begins to rise and controller 52 can detect the increase or delta in the temperature measurements fed back from the sensors to determine if there is a problem with low flow. Controller 52 may also use the temperature measurements to perform temperature compensation of the conductivity and pH readings obtained from sensors 68, 78 and 96.

As described with reference to FIG. 1, electrolytic cell 10 includes cathode chamber 14 (having cathode electrode 20), anode chamber 16 (having anode electrode 22 and auxiliary cathode electrode 24), and barrier 18. Cathode electrode 20 includes one or more electrodes located in cathode chamber 14 and is connected to the power source (not shown), such as through controller 52. Anode electrode 22 includes one or more electrodes located in anode chamber 16 and may also be connected to the power source, such as through controller 52. Auxiliary cathode electrode 24 includes one or more electrodes, which can be located on an opposite side of anode electrode 22 as barrier 18, as shown in FIG. 2, and/or can be located between anode electrode 22 and barrier 18, for example.

Barrier 50 includes a membrane (e.g., an ion exchange membrane) or other diaphragm or separator that separates cathode chamber 42 and anode chamber 46. In embodiments in which barrier 50 is a membrane, barrier 50 can include a cation exchange membrane (i.e., a proton exchange membrane) or an anion exchange membrane. Suitable cation exchange membranes include partially and fully fluorinated ionomers, polyaromatic ionomers, and combinations thereof. Examples of suitable commercially available ionomers for barrier 50 include sulfonated tetrafluorethylene copolymers available under the trademark "NAFION" from E.I. du Pont de Nemours and Company, Wilmington, Del.; perfluorinated carboxylic acid ionomers available under the trademark "FLEMION" from Asahi Glass Co., Ltd., Japan; perfluorinated sulfonic acid ionomers available under the trademark "ACIPLEX" Aciplex from Asahi Chemical Industries Co. Ltd., Japan; and combinations thereof. In some embodiments, barrier 50 includes a material that does not act as a selective ion exchange membrane, but maintains general separation of the anode and cathode compartments. In particular examples, the barrier material includes a hydrophilic microporous material that conducts current between the anode and cathode electrodes and facilitate production of bubbles in the output liquid. Exemplary materials for such a barrier include polypropylene, polyester, nylon, PEEK mesh, Polytetrafluoroethylene (PTFE), polyvinylidene difluoride and thermoplastic mesh, for example.

During operation, the mixed solution from mixed line 76 enters cathode chamber 14 and anode chamber 16. Controller 52 applies a voltage potential difference between anode electrode 22 and cathode electrode 20 and between anode electrode 22 and auxiliary cathode electrode 24, inducing electrical currents across electrolytic cell 10. This electrolyzes the solutions passing through electrolysis cell 10. As such, the mixed solution that flows through cathode chamber 14 from mixed line 76 is electrolyzed to form a catholyte stream that exits cathode chamber 14 through catholyte outlet 34. Hydroxide ions (OH⁻) and hydrogen gas (H$_2$) are primarily produced at the cathode:

$$2H_2O(l) + 2e^- \rightarrow H_2(g) + 2OH^-(aq)$$

The hydrogen gas exits the cell and is diluted with air before venting to atmosphere. The hydroxide ions associate with positive ions in the mixed electrolyte solution, such as sodium ions (Na+) or potassium ions (Ka⁺), to form liquid hydroxides, such as sodium hydroxide (NaOH) or potassium hydroxide (KaOH), which have known and cleaning properties.

The mixed solution that flows through anode chamber 16 from mixed line 76 is electrolyzed to form an anolyte stream, which exits anode chamber 16 through anolyte outlet 36. At the anode, primarily chlorine gas (Cl$_2$), oxygen gas (O$_2$), and acid ions (H⁺ or H$_3$O⁺) are produced:

$$2Cl^- \rightarrow Cl_2(g) + 2e^-$$

$$2H_2O(l) \rightarrow O_2(g) + 4H^+(aq) + 4e^-$$

The chlorine gas hydrolyzes into both hypochlorous acid (HOCl) and hydrochloric acid (HCl), which in water completely ionizes into (H⁺ or H$_3$O⁺) and Cl⁻ ions:

$$Cl_2 + H_2O - HCl + HClO$$

$$HCl + H_2O \rightarrow H_3O^+ + Cl^-$$

At the auxiliary cathode primarily hydroxide ions (OH⁻) and hydrogen gas (H$_2$) is produced. Both the oxygen and hydrogen gas exits the cell together and is diluted with air before venting to atmosphere. The hydroxide ions (OH⁻) produced by the auxiliary cathode react immediately with and neutralize the acid ions (H⁺ or H$_3$O⁺) produced by the anode to recombine into water molecules (H$_2$O):

$$OH^-(aq) + H^+(aq) \rightarrow H_2O$$

This results in a nearly neutral pH anolyte solution with primarily HOCl as the final product if the pH is maintained within the range of 5-7 pH. The amount of current required by the auxiliary cathode to neutralize most of the acid produced by the anode is a function of several factors, including the flow rate, electrolytic and separator efficiency, salt concentration in the electrolyte, and chlorine efficiency of the anode catalyst. The relative efficiency of the anode in making chlorine gas (Cl$_2$) versus producing oxygen gas (O$_2$) and acid ions (H⁺) is determined by the electrolytic properties of the catalyst coating on the anode (e.g., a mixed metal oxide catalyst such as iridium and ruthenium oxide) and is also a function of the concentration of salt or chloride (Cl⁻) ions in the electrolyte solution.

One or both of the catholyte stream and the anolyte stream may be dispensed directly to perform a cleaning and/or sanitizing operation or may be dispensed into respective catholyte and anolyte tanks 90 and 92 for immediate or later use. Controller 52 may monitor the temperature of the catholyte and/or anolyte streams through one or more temperature sensors, such as temperature sensor 94 shown coupled to the catholyte outlet 34. In this embodiment, system 50 lacks any liquid feedback from catholyte outlet 34 or anolyte outlet 36 to either inlet 30 to cathode chamber 14 or inlet 32 to anode chamber 16.

Controller 52 monitors the pH of the anolyte stream produced through outlet 36 through pH sensor 96 to provide a closed-loop control of the pH by modulating or otherwise controlling individual and/or relative currents passed through cathode electrode 20 and auxiliary cathode electrode in response to the measured pH of the anolyte stream. In one example, a signal representing the measured pH of the anolyte output stream is fed back to a pH control input 97 of controller 52. Controller 52 is configured to adjust the level of current applied to the auxiliary cathode electrode 24 in response to the feedback signal received on pH control input 97 to thereby maintain the measured pH within a desired range. For example, if the measured pH drops below a target pH range or low pH threshold (such as below 4 pH or 5 pH), controller 52 may increase the current applied to auxiliary cathode electrode 24 to increase the pH of the anolyte output stream. If the measured pH raises above a target pH range or high pH threshold (such as above 7 pH), controller 52 may decrease the current applied to auxiliary cathode electrode 24 to reduce the pH of the anolyte output stream. In an exemplary embodiment, pH sensor 96 is positioned a sufficient distance from the outlet of cell 10 and is electrically isolated from the circuit that drives the cell electrodes to avoid erroneous readings. Transient electrical currents from the cell can interfere with the sensor operation.

In an alternative embodiment, controller 52 is configured to implement an open-loop control of the pH of the anolyte stream. The pH sensor 96 may be coupled to a humanly-perceptible pH indicator 98, such as a light, dial or digital readout, which provides a user with an indication representative of the pH of the anolyte output stream. An operator may observe or otherwise sense the state of indicator 98 and then manually adjust pH control input 97 of controller 52, such as with a dial, a keyboard or other user interface device, as a function of the pH indication to adjust the current applied to the auxiliary cathode electrode 24. In another embodiment, pH sensor 96 comprises a pH reagent in the form of liquid droplets or test strip, for example, which is placed by the user in contact with the anolyte output stream. The user observes a resulting color change, for example, to measure the pH.

When the pH of the resulting anolyte stream is maintained within the desired range, the stream may contain a desirable concentration of hypochlorous acid, and the liquid from the stream may then be used for purposes of disinfecting surfaces and areas, for example. Additionally, the catholyte stream from catholyte outlet 34 may also be used, if desired, for cleaning purposes. Anolyte outlet 36 and/or catholyte outlet 34 may include any suitable output or dispensing device. For example, anolyte outlet 34 and/or catholyte outlet 32 may each include any suitable dispenser, such as a hand-activated nozzle (e.g., similar to a gas pump nozzle) that a user may hold and activate (e.g., with a trigger or lever) to dispense the desired output solution from generator 50. Excess or unused solution can be dispensed into tanks 90 and 92, for example.

The open or closed process control loop allows controller 52 to ensure that a first preset salt concentration is substantially maintained in the mixed solution entering the cathode chamber and that the anolyte output stream has a pH between 5 pH-7 pH so that the predominant form of free chlorine in the anolyte output stream is hypochlorous acid. This allows the pH to be substantially maintained at desired levels to consistently provide high-quality hypochlorous acid to anolyte output 36 for use as a disinfectant to kill microorganism-based contaminants, for example.

As a result, the generator may have simplified hydraulic plumbing and mechanical controls, higher reliability and lower cost, higher electrolytic cell efficiencies, and/or greater dynamic control over the resulting pH of the anolyte hypochlorous output.

In one example, controller 52 includes a power supply that uses pulse-width modulation to control the average voltage and current supplied to the electrodes in electrolytic cell 10. Current sensors may be placed in series with one or more of the electrodes 20, 22 and 24 to measure the currents induced across cell 10 and provide feedback to a control loop for maintaining a constant overall current to the cell by modulating the relative currents supplied to cathode electrode 20 and auxiliary cathode electrode 24. Alternatively, the power supply control loop controls the currents supplied to cathode electrode 20 and auxiliary cathode electrode 24 independently from one another such that the overall current to the cell may vary. In one exemplary embodiment, the power supply directs a greater amount of current to auxiliary cathode electrode 24 than to the primary cathode electrode 20 during normal operation when the mixed solution passes through cell 10.

The current measurements may also be used to adjust the flow rate of the brine solution (via pump 72) into mixing chamber 74 based on the measured electrical currents. In an alternative embodiment, the current measurements may also be used to adjust the flow rate of the softened water (via a dynamically-controlled valve), but this type of control adds further cost to the system. These adjustments assist in ensuring that the mixed solution flowing to electrolysis cell 10 has a consistent and controlled salt concentration, allowing electrolysis cell 10 to generate a high-quality, concentrated alkaline solution in cathode chamber 14 and a near neutral pH solution in anode chamber 16 with controlled compositional properties.

Figure 3:
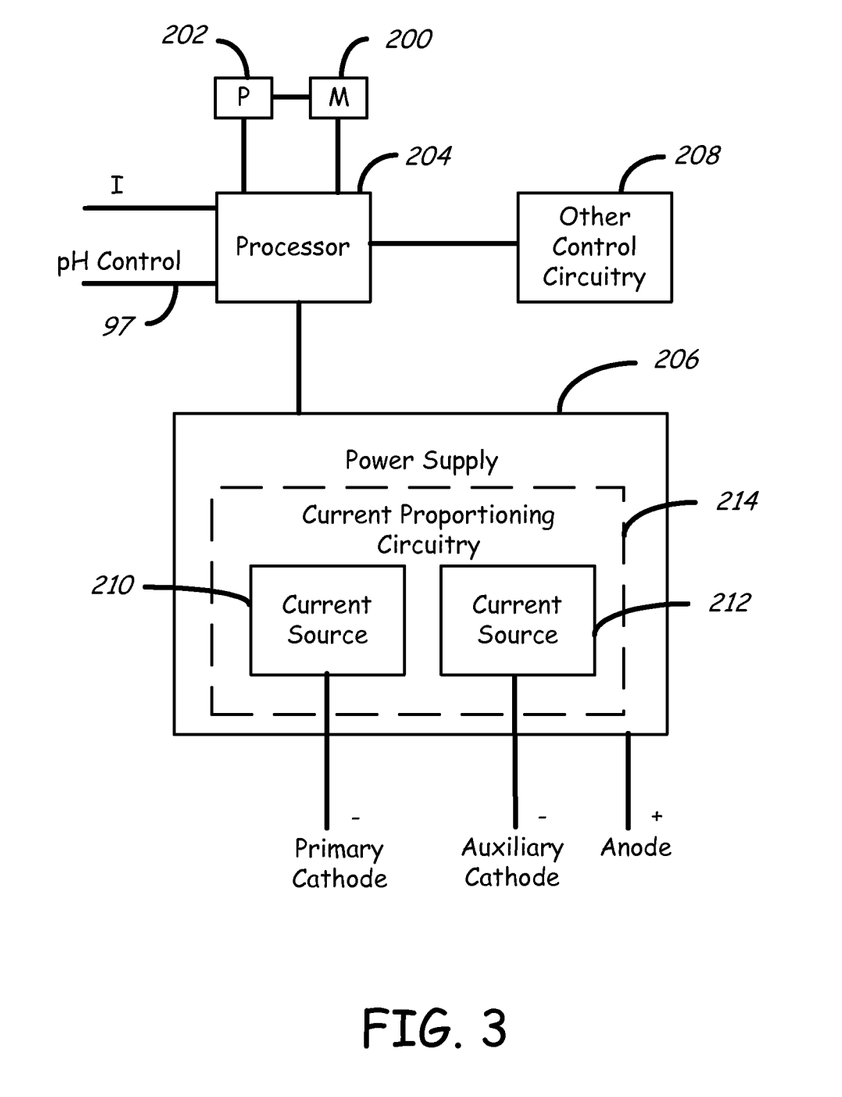
FIG. 3 is a block diagram of a controller configured to control the generator shown in FIG. 2, according to an exemplary aspect of the present disclosure

FIG. 3 is a simplified diagram illustrating an example of a portion of controller 52 according to an embodiment of the present disclosure. In this example, controller 52 includes a memory 200, a computer program 202 stored in the memory 200, a processing unit 204, a power supply 206 and other control circuitry 208. Processing unit 204 can include, for example, a microprocessor or microcontroller, which is controlled by the computer program 202 to implement a method of generating hypochlorous acid according to one or more of the various steps discussed herein. On initialization, code instructions of the computer program 202 are, for example, loaded into a RAM memory and executed by processing unit 204 to implement the steps of the methods described herein. In a particular example, processing unit 204 includes a microcontroller that is programmed by a control header (i.e., program 202) that is loaded into the microcontroller from memory 200 and executed by the microcontroller to perform a control function. In another embodiment, processing unit 204 is implemented entirely in hardware without using software instructions.

The processing unit 204 receives pH control input 97 and any other control inputs, labeled "I" in FIG. 3, such as user controls and measurements from other sensors included in the generator. For example, these other sensors may include conductivity sensors 68, 78 and temperature sensors 80 and 94. Processing unit 204 may be configured to control the other control circuitry 208 based on these other sensor inputs for controlling various other elements of generator 50, such as pressure regulator 62, valve 64, pump 72 and flow switch 82, according to respective, predetermined control functions. Processing unit 204 is coupled to power supply 206 to adjust or otherwise modulate the relative currents delivered to the primary and auxiliary cathode electrodes 20, 24 as a function of the pH control input 97.

Power supply 206 applies respective voltage potentials to the first cathode electrode 20, anode electrode 22 and auxiliary cathode electrode 24 for inducing currents through the respective electrodes. In the example shown in FIG. 3, power supply 206 includes a first current source 210 configured to control a level of current induced in the first cathode electrode 20, and a second current source 212 configured to control a level of current induced in the auxiliary cathode electrode 24. Due to the relative polarities of anode electrode 22 and the cathode electrodes 20 and 24, the cathode electrodes 20, 24 act as returns for the total level of current induced in anode electrode 22, this current being divided between the cathode electrodes. In one example, power supply 206 includes a current proportioning circuit 214 which, in response to pH control input 97, adjusts the portion of the total current that is applied to the auxiliary cathode 24 relative to the portion of the total current that is applied to the first cathode 20 such that the total current applied to the electrolytic cell 10 remains substantially constant.

By using pulse-width modulation, for example, power supply 206 can vary both the average currents and voltages to each cathode independently or can control them dependently such that the total current (through the anode) stays constant. By holding the total current constant the system can make a substantially constant amount of free chlorine in the anolyte output, assuming that the average flow rates and salt concentrations in the cell electrolyte also remain constant.

In a particular example, even with the "constant total cell current" approach, both cathodes will essentially be conducting current at the same time, since the PWM frequency is at least 100 Hz or more. That means each cathode sees an effectively different average voltage from the power supply, for example.

In another example, power supply 206 can be configured to control current source 210 to maintain a substantially constant current through the first cathode electrode 20, and control current source 212 to adjust the level of current applied to the auxiliary cathode electrode 24 in response to the pH control input 97. In this example, the total level of current supplied to the electrolytic cell 10 varies.

EXAMPLE

Figure 4:
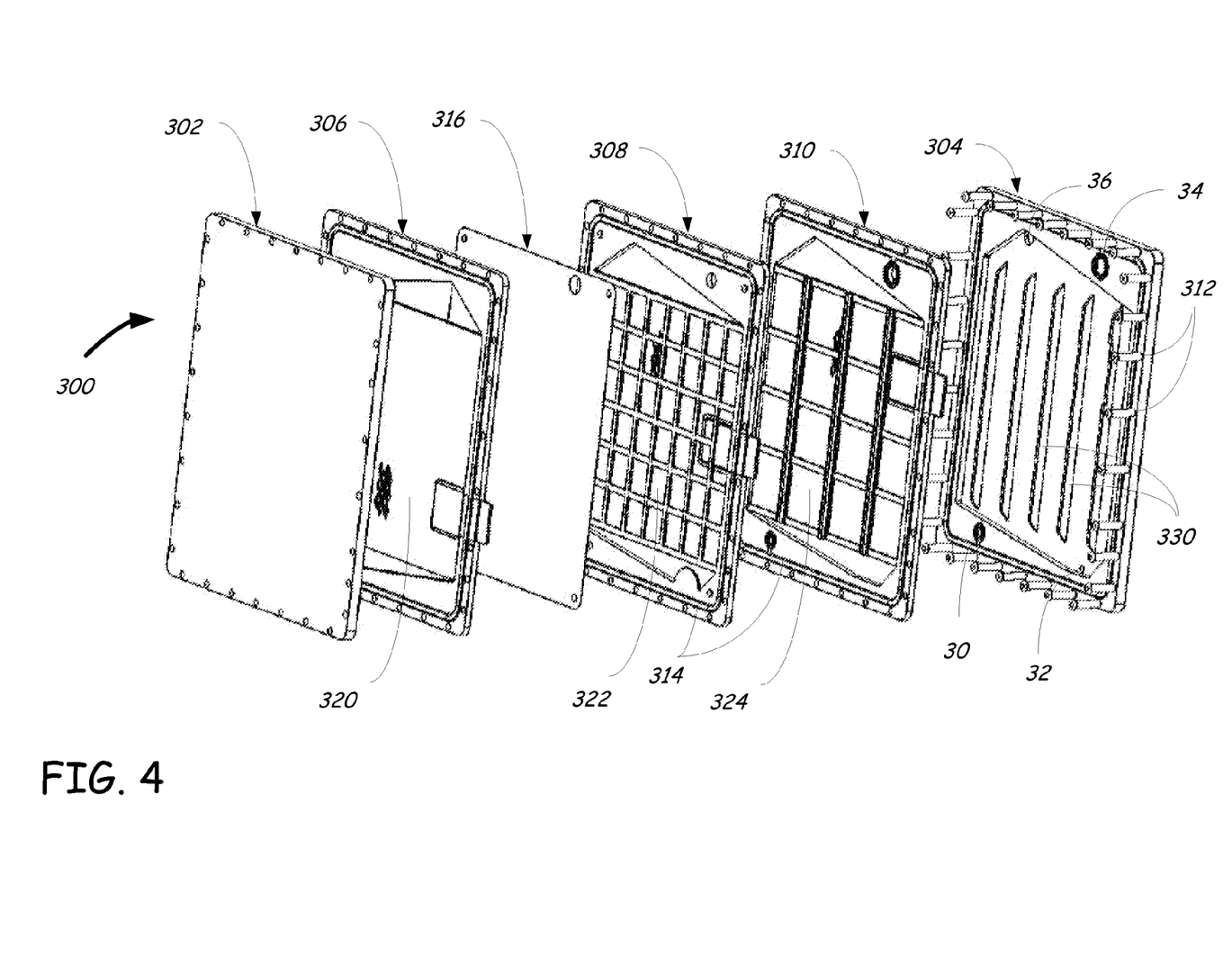
FIG. 4 is an exploded, perspective view of a three-electrode electrolysis cell according to a particular example of the present disclosure.

FIG. 4 is an exploded, perspective view of a three-electrode electrolytic cell 300 built and tested within a generator similar to that shown in FIG. 2, according to a particular example of the present disclosure. Cell 300 includes a housing formed by end plates 302, 304 and frame members 306, 308 and 310, molded from a chemical-resistant polymer, such as polypropylene, which is reinforced with 40% glass fibers (by weight) for added strength and stiffness. All of the housing members are secured together in a layered or "sandwich" configuration by one or more fasteners, such as bolts 312. The perimeter of each layer is sealed relative to the adjacent layer with one or more seals, such as O-rings 314 made from a chemical-resistant elastomer such as EPDM or Viton.

Frame member 306 carries a primary cathode electrode 320, which resides in a cathode chamber formed between end plate 302 and a barrier 316 that is spaced approximately 1.5 mm from the primary cathode. In this example, barrier 316 included a 0.1 micron porous hydrophilic separator approximately 107 microns in thickness. Barrier 316 is completely sealed around its perimeter to frame member 308, using an appropriate process such as adhesion, heat-sealing or ultrasonic welding, for example. The cathode chamber comprises 6 mm-deep vertical flow channels divided by equally-spaced support ribs integrally molded into the end plate 302 (not visible in FIG. 4). These flow channels allow for continuous vertical recirculation of the electrolyte fluid within the cathode chamber, driven by upward movement and transport of the gas bubbles generated at the surfaces of the electrode, thus improving the electrolytic efficiency of the cell by thorough mixing of the electrolyte and facilitating movement of ions to and from the electrode. Frame member 308 carries an anode electrode 322, which resides in an anode chamber formed between barrier 316 and end plate 304. The spacing between anode electrode 322 and barrier 316 is approximately 1.5 mm. Frame member 310 carries an auxiliary cathode electrode 324, which resides in the anode chamber, between the anode electrode 322 and end plate 304. Vertical flow channels 6 mm deep are formed by support ribs 330 that are integrally-molded into end plates 302 and 304, which facilitate the mixing of the electrolyte fluid in the anode and cathode chambers. The plenums formed by the space in the cathode and anode chambers above the electrodes are shaped to funnel the flow of gas bubbles and liquid upward and out of the cell via the outlet ports 34 and 36 in the end plate 304. The liquid is introduced into the respective chambers through inlet ports 30 and 32. All three electrodes 320, 322 and 324 included an approximately 150 mm square plate of 1.0 mm thick expanded titanium mesh. The cathode electrodes were uncoated titanium, and the anode electrode was coated on both sides with a mixed metal oxide catalyst of ruthenium and iridium oxide. An approximately 3 mm spacing between each electrode was maintained using polypropylene spacers that were integrally molded into the frames, but could be fabricated as separate parts, and were designed to allow a mostly unobstructed vertical flow of the electrolyte fluid and gas bubbles within the channels between the electrodes 320 and 322 and the barrier 316 and between the electrodes 322 and 324. This provided a 4 mm center-to-center distance as each frame was 4 mm thick, for example.

During one round of testing softened tap water (approximately 19 grains of hardness) was employed as the base electrolyte fluid with approximately 4000 ppm of dissolved sodium chloride (table salt). The electrolyte was pumped through the cell at a constant total flow rate of approximately 150 ml/min with a catholyte output flow rate of 55 ml/min and anolyte output flow of 95 ml/min. A nearly zero pressure differential was maintained inside the cell from the cathode to anode chamber across the barrier 316. The overall current sent to the cell 300 was held constant at 15 amps and the proportioning of current between the primary and auxiliary cathodes 320, 322 was modulated electrically to affect the pH of the resulting anolyte output. The voltage across the cell at 15 amps using the above electrolyte was 6-8 volts. Between 5-6 amps was sent to the primary cathode 320, and 9-10 amps was sent to the auxiliary cathode 324 to maintain the anolyte output at 6.6 pH. The resulting anolyte produced contained approximately 1400 ppm of free chlorine as presumed to be predominantly hypochlorous acid in the range between 5-7 pH. The catholyte output was 12.3 pH. Both outputs were intended to be diluted down using softened tap water before end user usage by approximate dilution factors of 10:1 for the catholyte and 7:1 for the anolyte, for example.

By adjusting and controlling the amount of current sent to the auxiliary cathode 324, the resulting anolyte pH was directly affected and controlled electrically: 1. increasing the current to the auxiliary cathode raised the pH of the anolyte output; and 2. lowering current to the auxiliary cathode reduced the pH of the anolyte.

Although the present disclosure has been described with reference to one or more embodiments, workers skilled in the art will recognize that changes may be made in form and detail without departing from the scope of the disclosure and/or the issued claims appended hereto. Also while certain embodiments and/or examples have been discussed herein, the scope of the invention is not limited to such embodiments and/or examples. One skilled in the art may implement variations of these embodiments and/or examples that will be covered by one or more issued claims appended hereto.

The invention claimed is:

1. A method comprising:
electrolyzing a source liquid in an electrolytic device comprising:
a first cathode in a cathode chamber; and
an anode and a second, auxiliary cathode in an anode chamber, wherein the anode chamber and cathode chamber are separated by a barrier and the anode and the auxiliary cathode are separated by a gap that lacks a barrier, the anode being positioned between the barrier and the second, auxiliary cathode; and
during the step of electrolyzing, adjusting a level of current applied to the auxiliary cathode by a control circuit in response to pH of an anolyte liquid produced from the source liquid by the anode chamber, the control circuit energizing the electrolytic device.

2. The method of claim 1, further comprising:
measuring the pH of the anolyte liquid with a pH sensor along a liquid flow path downstream of the anode chamber.

3. The method of claim 1, wherein the step of adjusting comprises adjusting the level of current applied to the auxiliary cathode by a control circuit within a closed process control loop with respect to the pH of the anolyte liquid.

4. The method of claim 1, wherein the step of adjusting comprises adjusting the level of current applied to the auxiliary cathode by a control circuit within an open process control loop with respect to the pH of the anolyte liquid.

5. The method of claim 1, wherein energizing electrolyzing comprises applying current to the first cathode, the auxiliary cathode and the anode simultaneously.

6. The method of claim 1, wherein adjusting comprises:
measuring the pH of the anolyte liquid; and
adjusting the current applied to the auxiliary cathode so as to maintain the pH within a desired pH range.

7. The method of claim 6, wherein adjusting comprises:
if the pH is less than a desired low pH threshold, increasing the level of current applied to the auxiliary cathode; and
if the pH is greater than a desired high pH threshold, decreasing the level of current applied to the auxiliary cathode.

8. The method of claim 1, wherein the level of current applied to the auxiliary cathode is greater than a level of current applied to the first cathode during the steps of electrolyzing and adjusting.

9. The method of claim 1, wherein:
electrolyzing comprises applying a substantially constant total current to the electrolytic cell; and
adjusting comprises adjusting a portion of the total current applied to the auxiliary cathode relative to a portion of the total current applied to the first cathode such that the total current applied to the electrolytic cell remains substantially constant.

10. The method of claim 1, wherein adjusting comprises:
holding a level of current applied to the first cathode substantially constant during the step of electrolyzing; and
adjusting the level of current applied to the auxiliary cathode in response to the pH of the anolyte liquid.

11. The method of claim 10, further comprising:
adjusting a concentration of salt in the source liquid to maintain a desired range of concentration of free chlorine in the anolyte liquid, in response to changes in the level of current applied to the auxiliary cathode.

12. A system for generating hypochlorous acid, the system comprising:
an electrolytic cell configured to receive a source liquid and comprising:
a first cathode in a cathode chamber; and
an anode and a second, auxiliary cathode in an anode chamber, wherein the anode chamber and cathode chamber are separated by a barrier and the anode and the auxiliary cathode are separated by a gap that lacks a barrier, the anode being positioned between the barrier and the second, auxiliary cathode; and
a control circuit comprising a pH control input and being configured to energize the electrolytic cell to produce an anolyte liquid from the source liquid in the anode chamber, the control circuit further being configured to adjust a level of current applied to the auxiliary cathode in response to the pH control input.

13. The system of claim 12, further comprising:
a pH sensor, which is positioned to measure pH the anolyte liquid.

14. The system of claim 13, wherein the control circuit comprises:
a closed-process control loop, which adjusts the level of current applied to the auxiliary cathode in response to pH measurements received by the pH control input from the pH sensor.

15. The system of claim 13, wherein the control circuit comprises:
an open loop, which adjusts the level of current applied to the auxiliary cathode in response to control signals applied to the pH control input.

16. The system of claim 12, wherein the control circuit is configured to apply current to the first cathode, the auxiliary cathode and the anode simultaneously.

17. The system of claim 12, wherein the control circuit is configured to adjust the current applied to the auxiliary cathode so as to maintain pH of the anolyte liquid within a desired pH range.

18. The system of claim 17, wherein the control circuit comprises circuitry configured to:
increase the level of current applied to the auxiliary cathode, if the pH is less than a desired low pH threshold; and
decrease the level of current applied to the auxiliary cathode, if the pH is greater than a desired high pH threshold.

19. The system of claim 12, wherein the control circuit is configured to apply a greater level of current to the auxiliary cathode than to the first cathode while energizing the electrolytic cell and adjusting the level of current applied to the auxiliary cathode.

20. The system of claim 12, wherein the control circuit comprises:
a constant current source, configured to apply a substantially constant total current to the electrolytic cell; and
a current proportioning circuit, which adjusts a portion of the total current applied to the auxiliary cathode in response to the pH control input, relative to a portion of the total current applied to the first cathode such that the total current applied to the electrolytic cell remains substantially constant.

21. The system of claim 12, wherein the control circuit comprises:
a first current source configured to apply a substantially constant level of current to the first cathode; and
a second current source configured to adjust the level of current applied to the auxiliary cathode in response to the pH control input, while the level of current applied to the first cathode remains substantially constant.

22. The system of claim 21, further comprising:
a water line configured to receive water;
a first brine line configured to receive a first brine solution;
a pump configured to move the first brine solution through the first brine line, wherein the pump is controlled by the control circuit based on the level of current applied to the auxiliary cathode; and
a mixing location configured to receive the water and the first brine solution from the water line and the first brine line, and to output a mixture of the water and the first brine solution as the source liquid.

23. The system of claim 12, wherein the barrier is formed of a hydrophilic microporous material that conducts electrical current between the anode chamber and the cathode chamber and does not act as an ion exchange membrane.

* * * * *